United States Patent Office 3,565,673
Patented Feb. 23, 1971

3,565,673
NITROGEN-FREE MOLDING COMPOSITION
Peter Herbert Richard Bryan Lemon, "Pandale," Newtown Road, Newtown, Romsey, Hampshire, England; John Ireland, 21 Alfriston Gardens, Sholing, Southampton, Hampshire, England; and Frederick Louis Le Serve, 17 Eastwood, Crawley, Sussex, England
No Drawing. Filed Nov. 13, 1968, Ser. No. 775,503
Claims priority, application Great Britain, Nov. 14, 1967, 51,867/67
Int. Cl. B44d *1/09;* C08g *37/08*
U.S. Cl. 117—100                                     8 Claims

ABSTRACT OF THE DISCLOSURE

This invention relates to nitrogen-free moulding compositions and to the method of preparing substantially nitrogen-free moulds and cores, wherein a granular refractory material is coated with a liquid novolak, liquid resole, and a waxy material and the pH of coated sand, measured as hereinafter described, is below about 5.5.

BACKGROUND OF THE INVENTION

It has long been known and is now common practice to coat refractory granules, particularly sand, with phenolic novolak resins and to employ the products in conjunction with hexamine (hexamethylene tetramine) as curing agent, for the production of foundry moulds and cores by the shell moulding process. In this process a heated pattern of the desired form is invested with the coated granules which first become adhesive and subsequently form a hard, coherent mass as a result of the fusion and subsequent hardening of the resinous coating material.

It is known, however, that in the casting of certain metals, particularly steel and nodular iron, there is a marked tendency to a defect known as "pinholing" when a moulding mixture is employed which contains nitrogen. There is thus a disadvantage in the use of hexamine as a curing agent for phenolic resins used in moulding mixtures intended to come into contact with such metals. Attempts have therefore been made to employ alternative and nitrogen-free curing agents in such cases. It is known, for example, to use paraformaldehyde as a curing agent for phenolic novolaks, since this material acts as a formaldehyde donor and is capable of curing phenolic resins on the application of heat. When employed as foundry moulding mixtures however, compositions containing paraformaldehyde have a number of disadvantages among which are the tendency of the resins to be incompletely thermosetting, so that the moulds or cores produced deform on removal from the patterns, and the excessive amount of fume that is evolved during the curing operation.

It has previously been proposed, for example British Pat. No. 1,094,590, to prepare a foundry moulding composition substantially free from nitrogen by employing, as a coating for said refractory granules, an ortho-linked novolak phenolic resin in conjunction with a resole phenolic resin as curing agent therefor.

We have since found that although such a process is capable of providing moulding compositions having the desired freedom from nitrogen and capable of curing rapidly to form moulds and cores having excellent physical properties, it gave rise to difficulties during the coating operation. Specifically, the ortho-novolak/resole mixture, when applied to heated sand at the conventional coating temperature of 100° to 150° C. as described in British Pat. No. 1,094,590, reacts so rapidly that the reaction time is extremely critical. Insufficient reaction at the coating stage will result in a coated sand having poor storage properties and a tendency to a defect known as "peelback" when the coated sand is employed for the production of shell moulds or cores. Over-reaction, on the other hand, will produce a moulding sand having a high melting point which will give moulds or cores having poor surface finish and low strengths.

It has also been proposed to improve the control over the coating process by employing an acid-catalysed novolak in conjunction with a resole, the pH value of the coating below 5.5.

While such a system is less reactive at conventional coating temperatures than one in which an ortho-novolak/resole mixture is employed, it is still substantially difficult to control at the coating stage when a solid novolak resin is used as the acid-catalysed novolak component.

SUMMARY OF THE INVENTION

We have now found that a substantially nitrogen-free moulding material having good strength properties and capable of curing rapidly when employed for the manufacture of foundry shell moulds or cores can be prepared without difficulty by employing the novolak resin used for the coating of the granular refractory material in the form of a solution or suspension and adjusting the pH, if necessary, either before, during or after coating, so that the coated refractory material has a pH below 5.5 when tested as hereinafter defined.

Accordingly, the present invention comprises a process for the production of a substantially nitrogen-free moulding composition, which comprises mixing a granular refractory material with a liquid novolak resin, a liquid resole resin as curing agent therefor so as to coat the granules, and a minor proportion of a waxy material; and evaporating volatiles from the mixture while continuing the mixing action until the mixture is reduced to a free-flowing condition, the pH being adjusted, if necessary, so that the final composition has a pH below about 5.5, when measured as hereinafter described.

DETAILED DESCRIPTION

In the preferred method of carrying the invention into effect the liquid novolak resin (in the form of a solution or suspension) is premixed with the liquid resole resin employed as its curing agent before the mixture is applied to the refractory granules. It is possible, however, and it is also contemplated by the invention, to coat the refractory granules with the two components separately, either simultaneously or successively.

The invention is particularly directed towards the production of substantially nitrogen-free moulding mixtures and in consequence has been illustrated by reference to silica sand as the granular refractory material. The refractory material may, however, be any of the other granular products commonly employed in the production of foundry moulds and cores. Such products include zircon, olivine or chromite sands and granulated quartz. In addition, although the absence of nitrogen is not normally of importance for such purposes, the invention also has utility in the coating of abrasive granules for the production of shaped abrasive articles.

According to the invention a minor proportion, e.g. about 1 to 10% by weight based on the total weight of resin, of a waxy material is added during the mixing step. The wax reacts as a release agent which increases the surface tension of the resin and assists in causing the sand to deaggregate and increases the strength of the mould or core produced from the moulding composition. The waxy material may be a wax or wax-like material such as disclosed in British Pat. No. 753,164 and examples of suitable materials are paraffin wax, carnauba wax, bees-wax, polyethylene wax and calcium stearate. A particularly preferred waxy material is the synthetic wax known as "Acrawax" CT, which is a substituted polyamide of stearic acid. It will be noted that this preferred waxy material does contain nitrogen. However, the small amount of nitrogen introduced into the moulding composition by the use of a minor proportion of "Acrawax" CT does not have an untoward effect on pinholing compared with the use of a nitrogen-containing curing agent for the novolak resin and for the purpose of the present invention the moulding composition may be considered to be substantially nitrogen-free.

It is also envisaged that other additives commonly employed in foundry moulding mixtures may be incorporated. Thus plumbago, terra-flake, mill scale, and powder conditioners, such as anhydrous calcium silicate, finely divided silica gel, calcium sulphate hemihydrate or anhydrous copper sulphate, may be incorporated without departing from the scope of the invention.

The preferred novolak resin is a sulphuric acid catalysed phenol-formaldehyde resin. Conveniently, the novolak may be incompletely dehydrated or rehydrated at manufacture and maintained at elevated temperature until use or dissolved in methylated spirits or other solvent. If desired, the solvent used may include a proportion of a less volatile compatible non-solvent for the resin, as described, for example, in British patent specification No. 824,048.

Other phenols may be employed to replace all or part of the phenol in the preparation of the novolak resin, provided that they are substantially unsubstituted by unreactive groups on the ring positions ortho and para to the phenolic hydroxyl groups. Suitable phenols thus include meta-cresol, 3,5-xylenol and mixed isomers such as the products known as high-boiling tar acids.

The formaldehyde employed may, if desired, be wholly or in part in the form of paraformaldehyde. For convenience and from economic considerations, however, we prefer to employ an aqueous formaldehyde solution.

The molar ratio of phenol to formaldehyde should be between 1:0.5 and 1:0.9, preferably between 1:0.7 and 1:0.86. If less than 0.5 molar proportion of formaldehyde are employed the end product will have an undesirably low melting point while with amounts in excess of about 0.9 molar proportions the melting point will be undesirably high and there is, in addition, a danger that slight inaccuracies in weighing could result in gelation during manufacture.

The preferred catalyst for the production of the novolak resin is sulphuric acid. Other conventional catalysts for the production of novolak resins may, however, be used. Such catalysts include hydrochloric and oxalic acids, zinc borate and zinc acetate. Although not essential, it is preferred, where the catalyst employed is volatile or is insufficiently acidic to reduce the pH of the novolak/resole mixture to a value below about 4, to add additional acid after the manufacture of the novolak. Desirably any additional acid added after the coating of the refractory material should be a non-hygroscopic power in order to obviate any caking problems. Acidic additives which are suitable for this purpose include oxalic, salicylic and tartaric acids, the preferred additive being salicylic acid. Where, on the other hand, an acidic material is added to a liquid mixture of the novolak and resole prior to the coating of the refractory granules, normally liquid acids or acidic materials may be employed.

The preferred phenolic resole is one in which the phenol is phenol itself, although part of the phenol may, if desired, be replaced by meta-cresol, 3,5-xylenol or commercially available mixed isomers thereof. The ratio of phenol to formaldehyde is not critical and satisfactory products may be produced within the range 1.2 to 3.5 molar proportions of formaldehyde to one mole of the phenol. With amounts of formaldehyde above 3.0 moles to each mole of phenol, however, the products produced have an undesirably high content of free formaldehyde leading to objectionable fuming in use, while products in which the formaldehyde to phenol ratio is below about 1.5:1 require to be added to the novolak in increasingly large amounts as the formaldehyde content decreases, and the strengths obtainable decrease accordingly. We, therefore, prefer to employ from 1.6 to 2.8 molar proportions of formaldehyde to each mole of the phenol.

The catalyst employed for the manufacture of the resole resin may be any of the alkaline catalysts commonly employed, such as, for example the hydroxides of sodium, lithium or potassium, the oxides or hydroxides of calcium, barium or magnesium, or lithium, sodium or potassium carbonate. A particularly preferred catalyst is magnesium oxide. We prefer to avoid using nitrogenous materials, such as ammonium hydroxide or amines, as catalysts since, although such materials are satisfactory catalysts for the preparation of resole resins, they also enter into reaction with the resin and thereby introduced nitrogen into the composition. Where the amount of nitrogen thus introduced is not large, however, nitrogenous catalysts may prove satisfactory for the production of resoles to be employed in the present invention without disturbing the requirement that the final moulding composition should be substantially nitrogen free.

In preparing the resole resin to be used in the practice of the present invention it is generally unnecessary and undesirable to protract the condensation process greatly beyond the stage at which the simple methylol derivatives of the phenols are formed. Thus, the preferred resoles are those having low viscosities in solution and dilutabilities within the range 3.5:1 to 0.75:1 (water:resin). There is, however, no sharp distinction between those products which are suitable and those which are unsuitable and in some instances more highly condensed products may be satisfactory. In such cases, however, a smaller number of methylol groups will be available for the crosslinking of the novolak resin and it may, therefore, be desirable to employ the resole in an increased amount.

The pH value of the coated sand is determined by stirring 50 grams of the sand with 20 grams of industrial methylated spirits for 5 minutes and then mixing this slurry with 50 grams of deionised water. The resin and sand will form a coagulated mass and the pH of the supernatant aqueous liquid is then determined by means of a standard pH meter.

As will be readily appreciated by those skilled in the art, the properties of the novolak/resole mixture and consequently the properties of the coated sand produced, do not undergo a sudden change as the pH is reduced. Thus, while a pH value of 5.5 is intended to denote the upper limit of usefulness, the advantages of the invention are only achieved in full measure at lower values and we prefer to reduce the pH to a value below 4.5. There is also no precise lower limit but it will also be obvious to those skilled in the art that excessive quantities of acid may lead to corrosion or other difficulties.

In coating the refractory material with the novolak/resole mixture and wax it is important to insure the proper degree of reaction between the resole and the novolak. For this reason it is preferred to add the resins to the refractory simultaneously, or almost simultaneously, and to control the initial sand temperature. The specific temperature will vary dependent upon the resins and particular apparatus used, but the optimum temperatures and reaction time for each combination of resin and wax can be determined by testing the coated sand during mixing to obtain the following specifications:

(a) Investment rate—16.5 secs. (time to form a shell ¼″ thick)
(b) Peel back—Nil
(c) Melting point—80° to 87° C. (optimum)
(d) Hot tensile strength—8.0 kg./sq. cm. (minimum) (G. Fischer Machine)
(e) Loss on ignition—4.2% to 4.3%

During production the melting point and hot tensile strength tests are the most critical tests possessing a direct relationship to the mixer operating conditions. It has been found that if the melting point figures exceed 88° C. then the mix generally tends towards an over-reaction, hot tensile strength figures drop towards zero, and the mixer shell temperature increases. Conversely, if the melting point figures are lower than 80° C. then the mix generally tends towards an under-reaction, hot tensile strength figures increase about 15.0 kg./sq. cm., and the mixer shell temperature has fallen. Therefore, the melting point and hot tensile strength test figures should be maintained within the given specification in order to ensure correct mixing procedures are being adhered to. The resin content is kept constant under varying mixer conditions. This allows the figure for loss "on ignition" to remain consistently at approximately 4.2%.

The following examples illustrate the invention:

Example 1

Manufacture of novolak suspension.—To a resin kettle, provided with a steam-heated jacket, agitator, thermometer and reflux and distillation means, were charged 5271 pounds of 100% phenol, 21½ pounds of sulphuric acid and 3074 pounds of Formalin. The mix was then gently heated to initiate the reaction and the temperature was allowed to rise to 100° C. under vacuum reflux conditions. The contents of the kettle were then maintained under reflux at 100° C. for a further 1½ hours, after which volatiles were removed by distillation under atmospheric pressure up to a temperature of 117° C. This temperature was then maintained until the melting point, measured on a sample removed from the kettle, had risen to 54° C. 1682 pounds of water were then added and the whole agitated under reflux conditions until a uniform dispersion was attained. Cooling water was then applied to the jacket of the kettle and 1433 pounds of industrial methylated spirits added when the temperature had dropped to 80° C. The resultant product was a viscous suspension with a solids content of 67% and a viscosity of 160 poises at 30° C.

Manufacture of resole resin.—940 pounds (10 moles) of 100° phenol were mixed in a stainless steel kettle with 1,364 pounds (20 moles) of 44% formaldehyde solution and 35 pounds of a 32% solution of sodium hydroxide and heated cautiously to 75° C. The mixture was held at 75° C. for 35 minutes under reflux conditions and then cooled to 55° to 60° C. by applying vacuum. With the vessel set for vacuum distillation the resin was partially dehydrated under a vacuum of 28 inches of mercury until the temperature rose to 70° C. and the solids content of the resin reached 75%. The resole thus formed was then rapidly cooled and discharged. The product had a viscosity of 168 centistokes at 25° C. and a water dilutability at 20° C. of 14.5:1 (water:resin). The solids content was 75%.

Coating of refractory granules.—7½ pounds of the novolak made as above were mixed with 4 pounds of the resole and the mixture discharged into a mixer containing 190 pounds of Lynn SS sand and 10 pounds of mill scale maintained at 170° C. After mixing for 45 seconds, 10 ounces of salicylic acid and 5 ounces of a synthetic wax ("Acrawax" CT) were added. Mixing was continued for a further 8 minutes until bond breakdown occurred and the coated sand was reduced to a free-flowing condition. The pH of the coated sand, when tested as hereinbefore described, was 3.5. Samples of the coated sand were then subjected to storage and tensile strength tests.

Testing of coated sand.—A sample of the coated sand prepared as above was still free-flowing after 3 weeks storage at room temperature.

A further sample was then used to prepare dumbbell-shaped specimens by strickling the coated sand into a ¼ inch thick former on a hot-plate maintained at 200° C. Specimens were removed after 2, 3, and 4 minutes and tested immediately to give the following results:

| Cure time, minutes: | Breaking load, hot (pounds per square inch, tensile) |
| --- | --- |
| 2 | 215 |
| 3 | 280 |
| 4 | 340 |

A further specimen was cured for 8 minutes on the hot-plate and allowed to cool to room temperature before testing. In this case the tensile strength was 628 pounds per square inch.

The results obtained are comparable with those obtained in similar trials using a solid novolak resin. However, it was found in a series of trial production runs that the use of a solution or suspension of the novolak resin provided closer control of the coating process and consequently of the properties obtained.

Example 2

A hydrochloric acid catalyzed novolak was prepared from:

| | Parts |
| --- | --- |
| 100% phenol | 5827 |
| 1.16 S.G. hydrochloric acid | 56 |
| 44% methanol-free formaldehyde solution | 3467 |
| Water | 745 |
| Industrial methylated spirits | 2236 | by the method described in Example 1, except that the melting point of the dehydrated resin, before the addition of water and methylated spirits, was allowed to rise to 69° C.

The product, unlike that of Example 1, was a homogeneous solution with a viscosity of 32 poises at 25° C. and a solids content of 70%.

7½ pounds of this novolak solution were then mixed with 4 pounds of the resole of Example 1 and the mixture was employed to coat 190 pounds of Lynn SS sand by the procedure described in Example 1. The pH of the coated sand was 3.37.

When the same procedure was repeated but omitting the salicylic acid addition, the coated sand had a pH of 6.78.

The two batches of coated sand, when tested by the procedure described in Example 1, gave the following results, which indicate the faster cure-rate of the sample at the lower pH:

| | pH | Hot tensile strength, pounds per square inch after (minutes)— | | |
| --- | --- | --- | --- | --- |
| | | 2 | 3 | 4 |
| No acid addition | 6.78 | 72 | 240 | 296 |
| Acid added | 3.37 | 248 | 356 | 388 |

As in the case of the product of Example 1, these coated sands were substantially nitrogen-free and when tested in casting trials gave completely sound castings with no trace of pinholes.

Example 3

A second resole resin was prepared using the procedure of Example 1 except that in place of the sodium hydroxide solution 11.7 parts of magnesium oxide were employed as the catalyst. The resulting resole resin had a viscosity of 94.5 centistokes, a solids content of 75% and was infinitely dilutable with water.

Using this product in place of the resole of Example 1 but following the same procedure a coated sand having a pH of about 3.5 and the following tensile properties was produced:

Cure time—3 mins.
Hot tensile strength (250° C.)—144 pounds per square inch
Cold tensile strength—422 pounds per square inch Example 4

Following the procedure of Example 1 but using the resole of Example 3 and replacing the "Acrawax" CT by 5 ounces of calcium stearate as the waxy material, a coated sand having the following tensile properties was produced:

Cure time—3 mins.
Hot tensile strength (250° C.)—158 pounds per square inch
Cold tensile strength—460 pounds per square inch It will be understood that it is intended to cover all changes and modifications of the examples of the invention herein chosen for the purpose of illustration which do not constitute departures from the spirit and scope of the invention.

What is claimed is:

1. Free-flowing substantially nitrogen-free resin coated refractory granules consisting essentially of refractory granules coated with:
   (A) a partial reaction product of a resin, said resin being substantially free of nitrogen and consisting essentially of
      (a) a liquid novolak resin, said novolak prepared by reacting phenol and formaldehyde in the presence of an acid catalyst wherein the molar ratio of phenol to formaldehyde is between 1:0.5 and 1:0.9, and
      (b) a liquid resole resin, said resin prepared by reacting phenol and formaldehyde in the presence of an alkaline catalyst of an oxide or hydroxide of calcium, barium or magnesium wherein the molar ratio of formaldehyde to phenol is 1.2 to 3.5 moles of formaldehyde to one mole of phenol;
   (B) a waxy material admixed in said partial reaction product resin in a quantity of about 1 to 10% of said product resin:
   (C) wherein the ratio of resole to novolak is sufficient to react with said novolak to form a partial reaction product coating on the refractory wherein said coated refractory is free-flowing, said coating having a melting point of about 80° C. to 87° C. and a minimum hot tensile strength of at least about 8 kg. per square centimeter, said coated refractory having a pH below 4.5 as determined by measuring the supernatant formed by mixing 50 grams of deionized water with a slurry formed by stirring 50 grams of the coated sand with 20 grams of industrial methylated spirits for 5 minutes.

2. A coated refractory of claim 1 wherein the refractory is silica sand.

3. A coated refractory of claim 2 wherein the novolak is a suspension of a sulfuric acid catalyzed phenol-formaldehyde resin and the waxy material is a substituted polyamide of stearic acid.

4. Free-flowing substantially nitrogen-free resin coated silica sand, said coating consisting essentially of
   (A) a partial reaction product of a resin, said resin being substantially free of nitrogen and consisting essentially of
      (a) a liquid novolak resin, said novolak prepared by reacting phenol and formaldehyde in the presence of an acid catalyst, wherein the molar ratio of phenol to formaldehyde is between 1:0.5 and 1:0.9 and
      (b) a liquid resole resin, said resin prepared by reacting phenol and formaldehyde in the presence of an alkaline catalyst of an oxide or hydroxide of calcium, barium or magnesium wherein the molar ratio of formaldehyde to phenol is 1.2 to 3.5 moles of formaldehyde to one mole of phenol, the ratio of said novolak to resole being about 5 parts of novolak resin solids for 3 parts of resole resin solids;
   (B) a waxy material admixed in said partial reaction product resin in a quantity of about 1% to 10% of said product resin:
   (C) said coating having a melting point of about 80° C. to 87° C. and a minimum hot tensile strength of at least about 8 kg. per square centimeter, and wherein said coated sand has a pH below 4.5 as determined by measuring the supernatant formed by mixing 50 grams of deionized water with a slurry formed by stirring 50 grams of the coated sand with 20 grams of industrial methylated spirits for 5 minutes.

5. Free-flowing coated silica sand of claim 4 wherein the alkaline catalyst is magnesium oxide.

6. Free-flowing coated silica sand of claim 4 wherein said coating includes a conditioning agent of plumbago, terra-flake, mill scale, anhydrous calcium silicate, finely divided silica gel, calcium sulphate hemihydrate or anhydrous copper sulphate.

7. A process for the production of a substantially nitrogen-free, moulding composition which comprises:
   (A) mixing a granular refractory material with a coating composition consisting essentially of (a) a solution or suspension of a novolak resin and a liquid resole resin as a curing agent therefor (b) from about 1% to 10% of a waxy material, and a conditioning agent so as to coat the granules, said novolak prepared by reacting phenol and formaldehyde in the presence of an acid catalyst, wherein the molar ratio of phenol to formaldehyde is between 1:0.5 and 1:0.9 and said resole prepared by reacting phenol and formaldehyde in the presence of an alkaline catalyst of an oxide or hydroxide of calcium, barium or magnesium, wherein the molar ratio of formaldehyde to phenol is 1.2 to 3.5 moles of formaldehyde to one mole of phenol, the ratio of resole resin solids to novolak resin solids being sufficient to react with said novolak to form free-flowing partially reacted resin coated refractory granules on drying
   (B) evaporating volatiles from the mixture while continuing the mixing action until the mixture is reduced to a free-flowing condition, the coating on said coated refractory having a melting point of about 80° C. to 87° C. and a minimum hot tensile strength of at least 8 kg. per square centimeter;
   (C) maintaining the quantity of the acid catalyst together with an acidic material added in said coating to impart to the partially reacted coating of the free-flowing coated refractory a pH below 4.5 as determined by measuring the supernatant formed by mixing 50 grams of deionized water with the slurry formed by stirring 50 grams of the coated refractory with 20 grams of industrial methylated spirits for 5 minutes.

8. A process of claim 7 wherein the refractory is silica sand and the ratio of novolak resin solids to resole resin solids is about 5 to 3.

References Cited

UNITED STATES PATENTS

| 2,888,418 | 5/1959 | Albanese et al. | 117—123X |
|---|---|---|---|
| 2,913,787 | 11/1959 | Cooper | 117—100X |
| 2,965,514 | 12/1960 | Less et al. | 117—100 |
| 3,351,612 | 11/1967 | Brown et al. | 260—28 |
| 2,806,832 | 9/1957 | Drumm et al. | 117—100X |
| 2,829,982 | 8/1958 | Hoyt | 117—100X |
| 3,002,948 | 10/1961 | Lawther et al. | 117—100X |
| 3,004,312 | 10/1961 | Froberger | 117—100X |
| 3,410,718 | 11/1968 | Smith | 117—161 |

FOREIGN PATENTS

| 753,164 | 7/1956 | Great Britain | 117—100 |
|---|---|---|---|
| 820,048 | 9/1959 | Great Britain | 117—100 |
| 835,792 | 5/1960 | Great Britain | 117—100 |
| 932,690 | 7/1963 | Great Britain | 117—100 |
| 1,094,590 | 12/1967 | Great Britain | 117—100 |
| 571,467 | 3/1959 | Canada | 117—100 |
| 623,271 | 5/1949 | Great Britain | 117—100X |

WILLIAM D. MARTIN, Primary Examiner

M. R. P. PERRINE, Jr., Assistant Examiner

U.S. Cl. X.R.

117—123, 161, 168; 260—19, 28